US010933991B2

(12) United States Patent
Cottrell

(10) Patent No.: US 10,933,991 B2
(45) Date of Patent: Mar. 2, 2021

(54) PROPULSORS, AIRCRAFT INCLUDING THE PROPULSORS, AND METHODS OF DIRECTING A FLUID STREAM IN A PROPULSOR

(71) Applicant: Aurora Flight Sciences Corporation, Manassas, VA (US)

(72) Inventor: Daniel B. Cottrell, Centreville, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 516 days.

(21) Appl. No.: 16/011,501

(22) Filed: Jun. 18, 2018

(65) Prior Publication Data

US 2019/0382110 A1    Dec. 19, 2019

(51) Int. Cl.
*B64C 29/00* (2006.01)
*B64C 27/08* (2006.01)
(Continued)

(52) U.S. Cl.
CPC .......... *B64C 29/0025* (2013.01); *B64C 27/08* (2013.01); *B64C 27/20* (2013.01); *B64C 27/26* (2013.01)

(58) Field of Classification Search
CPC . B64C 29/0025; B64C 29/0066; B64C 27/08; B64C 27/20; B64C 27/26
See application file for complete search history.

(56) References Cited

U.S. PATENT DOCUMENTS 2,774,554 A * 12/1956 Ashwood ............ B64C 29/0066
                                          244/23 R
2,947,499 A *  8/1960 Douglas ................ B64C 23/005
                                          244/23 R
(Continued)

FOREIGN PATENT DOCUMENTS

GB           2037895         7/1980

OTHER PUBLICATIONS

European Patent Office, Extended European Search Report for related European Patent Application No. 19179782, dated Nov. 14, 2019.
(Continued)

*Primary Examiner* — Rodney A Bonnette
(74) *Attorney, Agent, or Firm* — Dascenzo Gates Intellectual Property Law, P.C.

(57) ABSTRACT

Propulsors, aircraft including the propulsors, and methods of directing a fluid stream in a propulsor. The propulsors include a housing defining a partially enclosed volume that extends from an inlet to both a first thrust outlet and a second thrust outlet. The propulsors also include a fan assembly including a plurality of blades and a blade pitch control mechanism that is configured to selectively vary a respective pitch angle of each blade in the plurality of blades. The fan assembly is configured to provide a motive force for fluid flow into the partially enclosed volume via the inlet. The propulsors further include an outlet flow control assembly configured to direct the fluid flow to preferentially exit the partially enclosed volume via a selected one of the first thrust outlet and the second thrust outlet. The aircraft include the propulsors. The methods include methods of operating the propulsors.

23 Claims, 7 Drawing Sheets

(51) Int. Cl.
*B64C 27/20* (2006.01)
*B64C 27/26* (2006.01)

(56) References Cited

U.S. PATENT DOCUMENTS

| | | | | |
|---|---|---|---|---|
| 2,947,501 | A * | 8/1960 | Flint | B64C 23/005 |
| | | | | 244/51 |
| 3,752,417 | A | 8/1973 | Lagace | |
| D808,329 | S | 1/2018 | Parks | |
| 10,040,547 | B1 * | 8/2018 | Pedigo | B64C 39/10 |
| 2012/0056034 | A1 * | 3/2012 | Kosheleff | B64C 29/0025 |
| | | | | 244/58 |
| 2016/0368601 | A1 | 12/2016 | Avery | |

OTHER PUBLICATIONS

European Patent Office, Communication Pursuant to Article 94(3) EPC for related European Patent Application No. 19179782, dated Nov. 19, 2020.

* cited by examiner

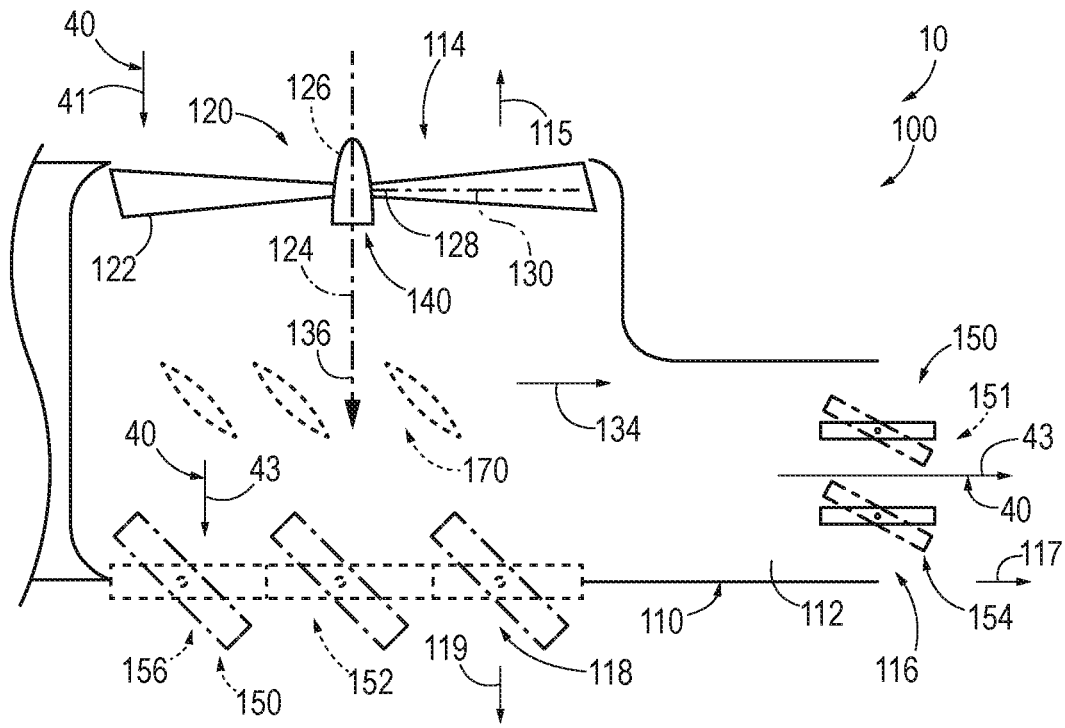

PROPULSORS, AIRCRAFT INCLUDING THE PROPULSORS, AND METHODS OF DIRECTING A FLUID STREAM IN A PROPULSOR

FIELD

The present disclosure relates generally to propulsors, to aircraft including the propulsors, and to methods of directing a fluid flow in a propulsor.

BACKGROUND

Propulsors may be utilized to generate propulsion and/or thrust. Examples of propulsors include turbine and/or propeller-based systems that may be powered by jet engines and/or by electrical motors. Propulsors often are utilized to propel aircraft and generally are configured such that the generated thrust propels the aircraft in a single direction. In the example of an airplane, the generated thrust generally propels the airplane in a forward and/or horizontal direction. In such a configuration, lift generally is generated via the flow of air over one or more wings of the aircraft. In the example of a helicopter, the generated thrust generally propels the helicopter in a vertical direction.

In certain circumstances, it may be desirable to configure an airplane for vertical take-off and landing (VTOL). These VTOL airplanes historically may utilize separate vertical and horizontal thrusters or tilt mechanisms to tilt, or physically translate/rotate, their propulsors between an orientation that provides vertical thrust, such as for take-off and landing, and an orientation that provides horizontal thrust, such as for horizontal flight. While separate thrusters may independently provide horizontal and vertical thrust, and while tilt mechanisms may be effective at permitting a single propulsor to provide both vertical and horizontal thrust, they may significantly increase the cost, complexity, and/or weight of the VTOL airplane. Thus, there exists a need for improved propulsors and also for improved methods of directing a fluid flow in a propulsor.

SUMMARY

Propulsors and methods of directing a fluid stream in a propulsor. The propulsors include a housing defining a partially enclosed volume that extends from an inlet to both a first thrust outlet and a second thrust outlet. The propulsors also include a fan assembly including a plurality of blades and a blade pitch control mechanism that is configured to selectively vary a respective pitch angle of each blade in the plurality of blades. The fan assembly is positioned at least partially within the partially enclosed volume and is configured to provide a motive force for fluid flow into the partially enclosed volume via the inlet. The propulsors further include an outlet flow control assembly configured to direct the fluid flow to preferentially exit the partially enclosed volume via a selected one of the first thrust outlet and the second thrust outlet. The aircraft include the propulsors.

The methods include methods of operating the propulsors. The methods include rotating the fan assembly of the propulsor about an axis of rotation and, responsive to the rotating, receiving the fluid flow into the partially enclosed volume via the inlet. The methods also include operating the propulsor in a radial flow configuration and operating the propulsor in an axial flow configuration. The operating the propulsor in the radial flow configuration includes adjusting the pitch angle of each blade to a radial flow pitch angle range and permitting the fluid flow to exit the partially enclosed volume via the first thrust outlet. The operating the propulsor in the axial flow configuration includes adjusting the pitch angle of each blade to an axial flow pitch angle range and permitting fluid flow from the partially enclosed volume via the second thrust outlet.

BRIEF DESCRIPTION OF THE DRAWINGS

FIG. 5 is a less schematic cross-sectional view of a propulsor, according to the present disclosure, in a radial flow configuration.

FIG. 6 is a less schematic cross-sectional view of the propulsor of FIG. 5 in an axial flow configuration.

DESCRIPTION

Figure 1:
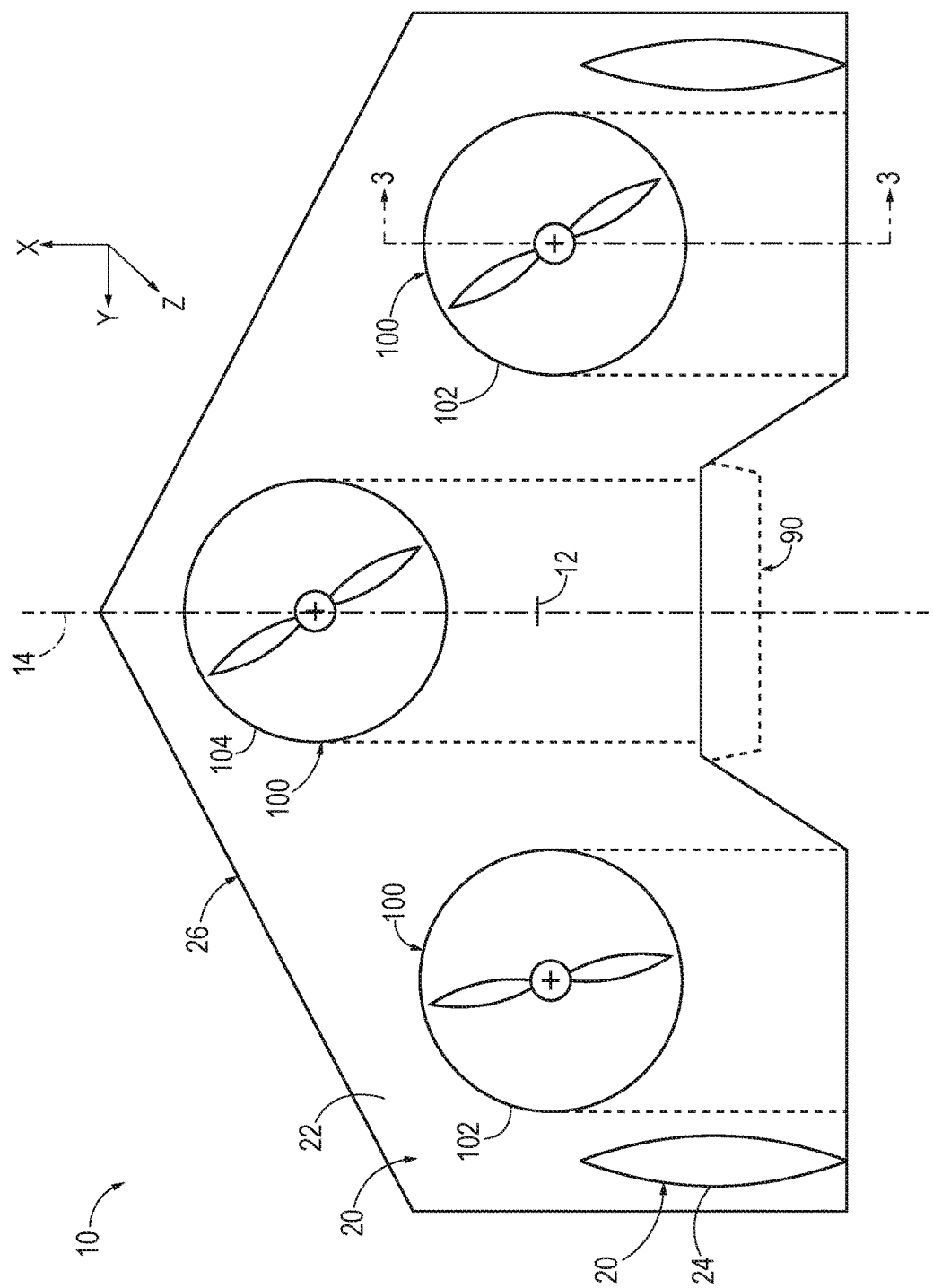
FIG. 1 is a schematic top view of an example of an aircraft that may include and/or utilize propulsors, according to the present disclosure.

FIGS. 1-10 provide illustrative, non-exclusive examples of propulsors 100 according to the present disclosure, of aircraft 10 that include propulsors 100, of components of propulsors 100, and/or of methods 300, according to the present disclosure, of directing a fluid flow in a propulsor. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic top view of an example of an aircraft 10 that may include and/or utilize propulsors 100, according to the present disclosure. Aircraft 10 includes at least one wing 22 and at least one propulsor 100. Wing 22 also may be referred to herein as and/or may include a control surface 20 for aircraft 10, and the aircraft may include other control surfaces 20, such one or more stabilizers, or vertical stabilizers, 24.

In the example of FIG. 1, aircraft 10 includes three propulsors 100, according to the present disclosure, and one additional, or supplemental, horizontal propulsor 90. Horizontal propulsor 90 is configured to provide supplemental thrust, supplemental horizontal thrust, and/or horizontal thrust and to be utilized during horizontal flight of aircraft 10. Such horizontal thrust may propel aircraft 10 along the x-axis that is illustrated in FIG. 1, and examples of horizontal propulsor 90 include conventional turbine and/or propeller-based aircraft engines.

In contrast, propulsors 100, according to the present disclosure, are configured to facilitate vertical take-off and landing of aircraft 10 as well as horizontal flight of the aircraft. Such propulsors 100 are configured to provide, or to selectively provide, horizontal thrust, vertical thrust, or a combination of both horizontal and vertical thrust. As such, propulsors 100 may provide thrust that conveys aircraft 10 along the x-axis that is illustrated in FIG. 1, along the z-axis that is illustrated in FIG. 1, and/or along both the x-axis and the z-axis.

As illustrated in FIG. 1, aircraft 10 may include at least two propulsors 100 that may be positioned on opposed sides of the aircraft, as indicated at 102. Such propulsors 100 also may be referred to herein as outlying propulsors 102 and may be at least substantially equally spaced from a center of mass 12 and/or from an axis of symmetry 14 of aircraft 10. Such a configuration may permit and/or facilitate flight control, balancing of aircraft 10, and/or balancing of moments created by thrust from the at least two propulsors 100 that are on opposed sides of aircraft 10.

As also illustrated in FIG. 1, aircraft 10 may include at least one propulsor 100 that may be centrally located within the aircraft and/or that may be positioned, or centered, along axis of symmetry 14 of the aircraft, as indicated at 104. Such a propulsor 100 also may be referred to herein as a central propulsor 104.

As illustrated in FIG. 1, propulsors 100 may be integral with, may be integrated into, and/or may form a portion of an airframe 26 of aircraft 10. Such a configuration may permit aircraft 10 to be lighter and/or more aerodynamic when compared to prior art aircraft that include engines that are attached to an external surface of the aircraft and/or that project from the aircraft.

Figure 2:
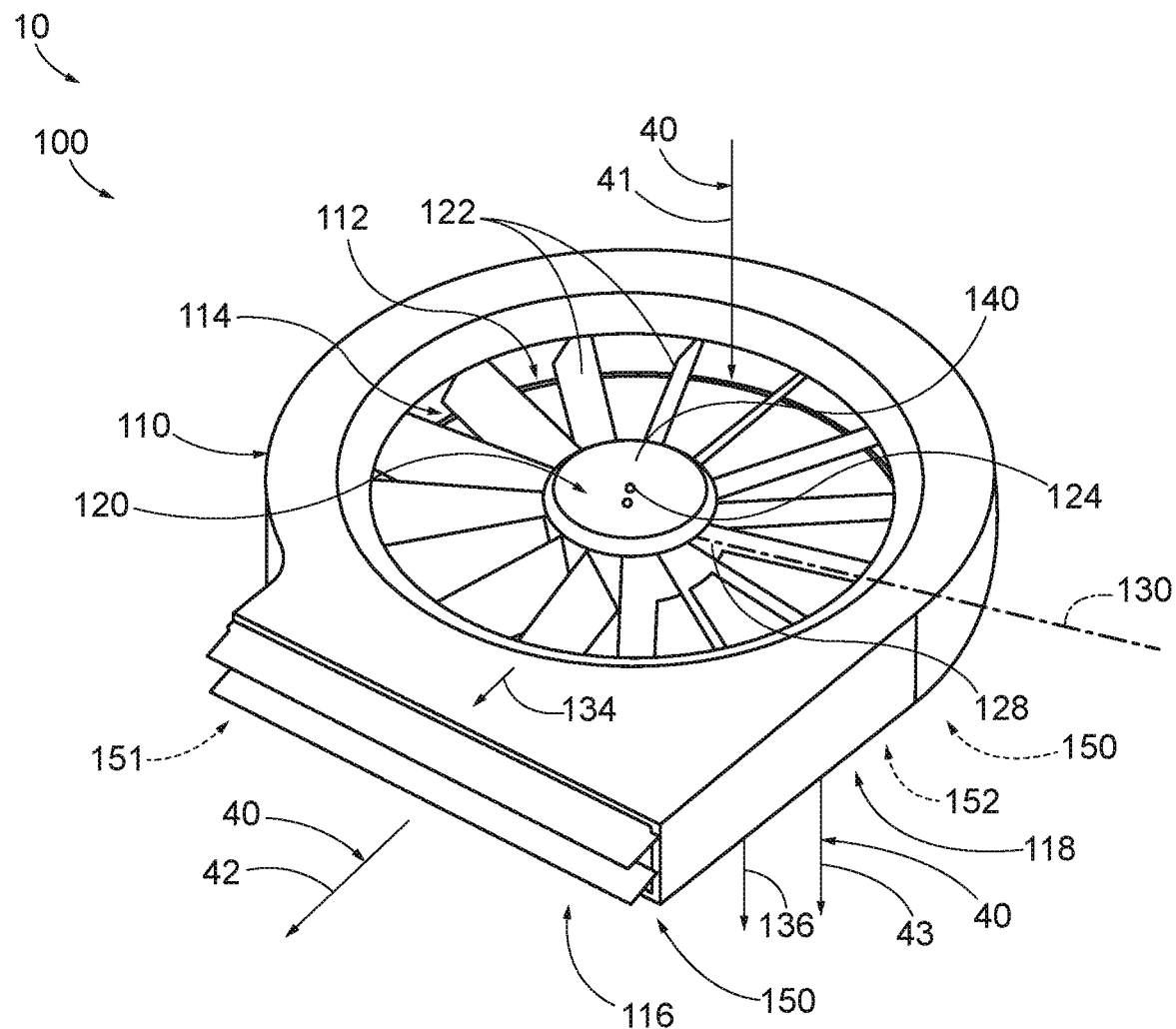
FIG. 2 is a perspective view of a propulsor according to the present disclosure.
Figure 3:
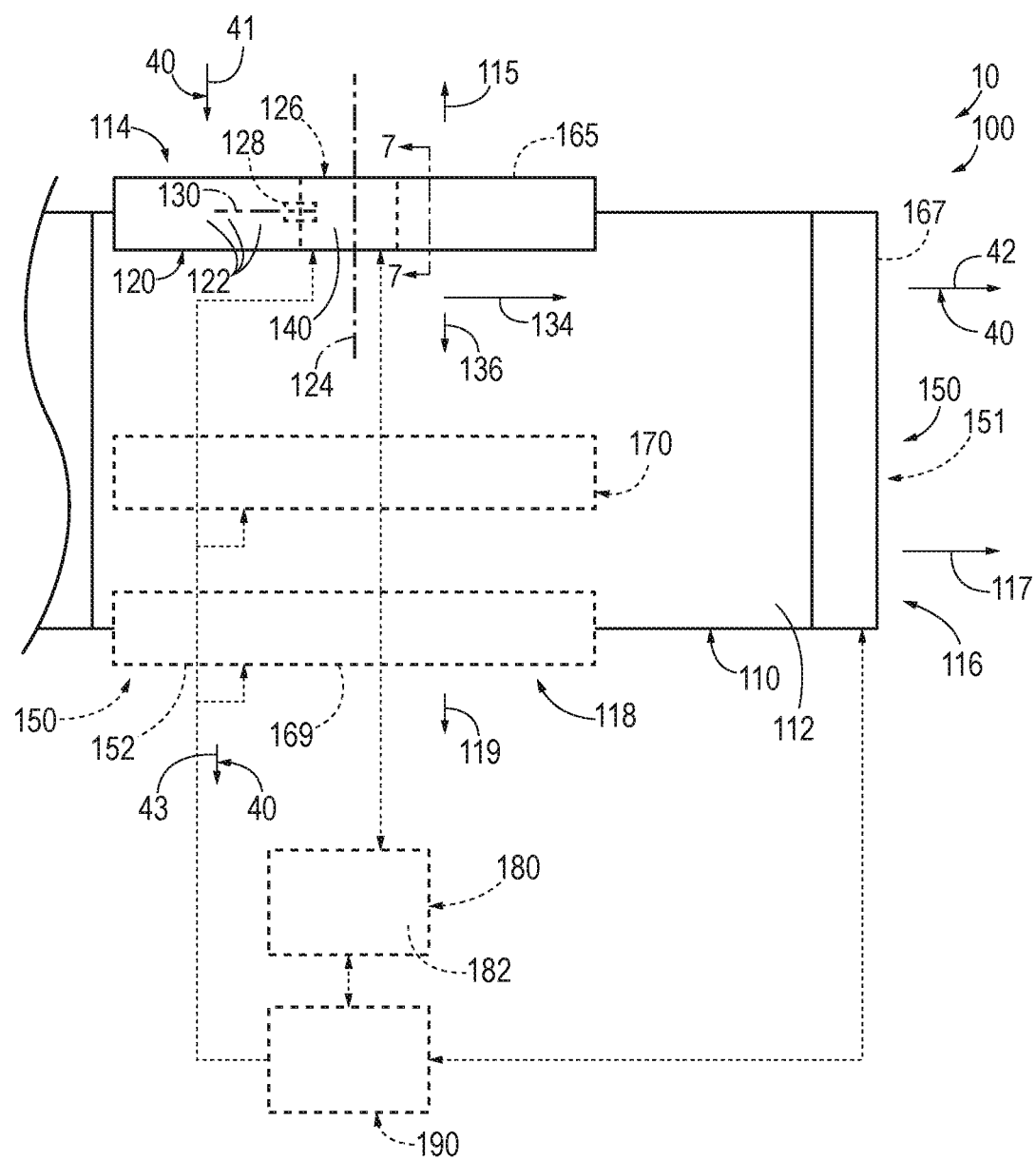
FIG. 3 is a schematic illustration of examples of propulsors according to the present disclosure.
Figure 4:
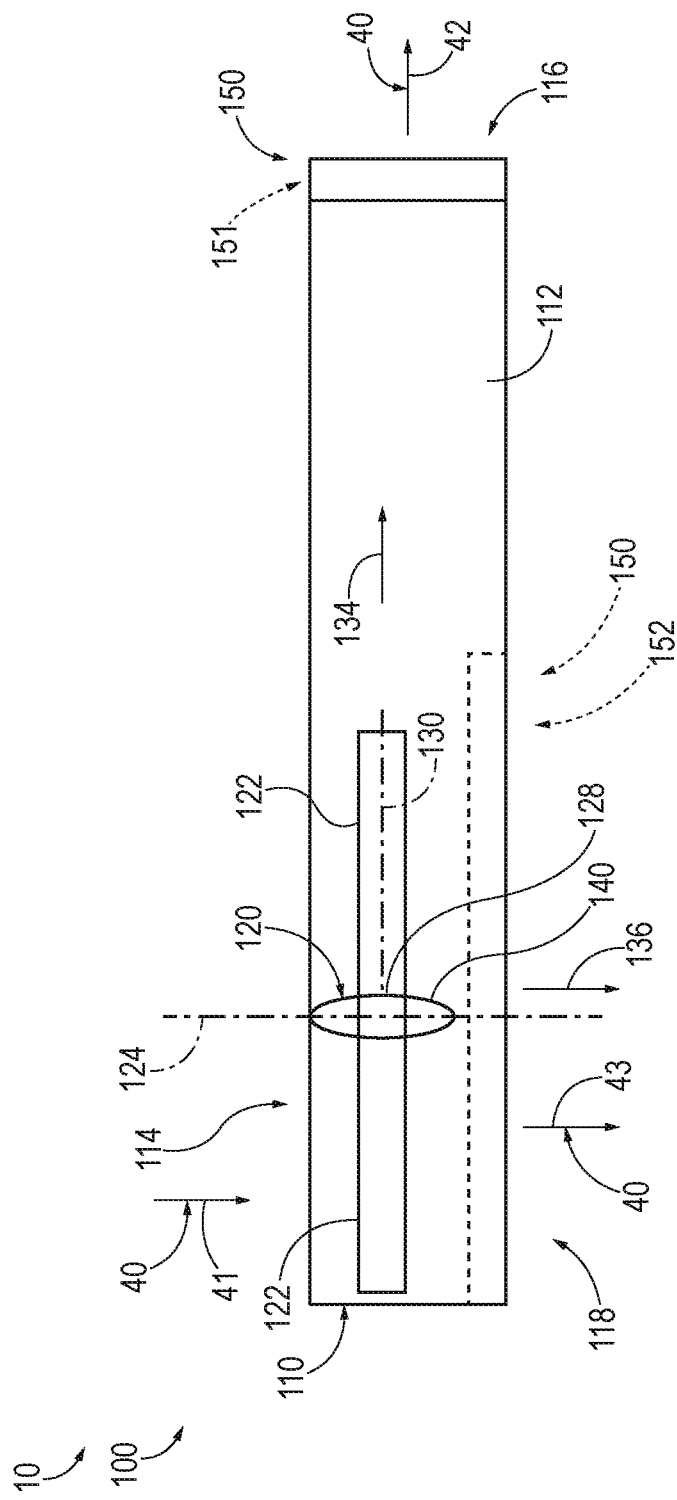
FIG. 4 is another schematic illustration of examples of propulsors according to the present disclosure.
Figure 8:
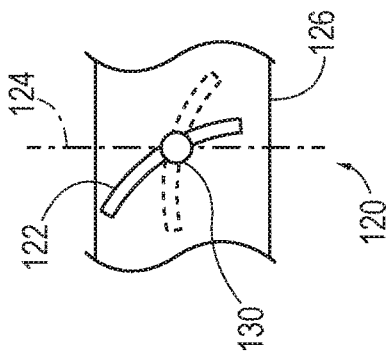
FIG. 8 is another schematic illustration of a portion of the propulsor of FIG. 3, taken along line 7-7 of FIG. 3.
Figure 7:
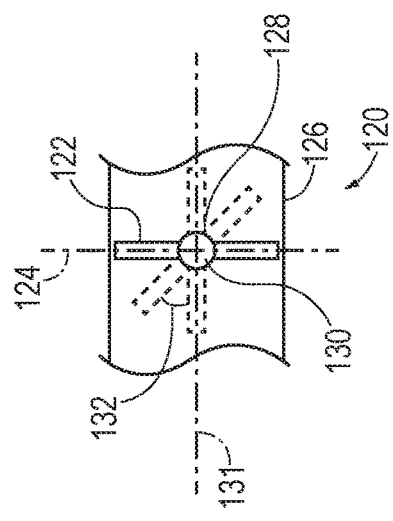
FIG. 7 is a schematic illustration of a portion of the propulsor of FIG. 3, taken along line 7-7 of FIG. 3.
Figure 9:
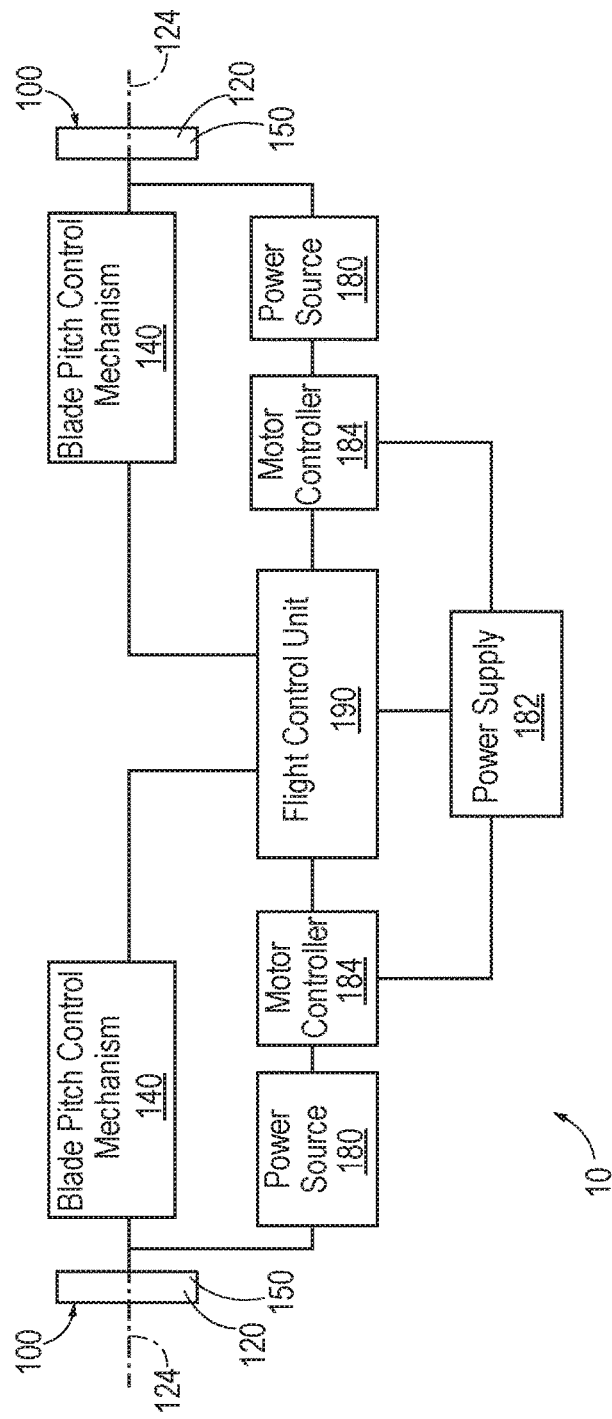
FIG. 9 is a block diagram illustrating components of an aircraft, according to the present disclosure.

FIG. 2 is a perspective view of a propulsor according to the present disclosure, while FIGS. 3 and 4 are schematic illustrations of examples of propulsors 100 according to the present disclosure. FIG. 5 is a less schematic cross-sectional view of a propulsor 100, according to the present disclosure, in a radial flow configuration; and FIG. 6 is a less schematic cross-sectional view of propulsor 100 of FIG. 5 in an axial flow configuration. FIG. 7 is a schematic illustration of a portion of propulsor 100 of FIG. 3, taken along line 7-7 of FIG. 3; and FIG. 8 is another, or an alternative, schematic illustration of a portion of propulsor 100 of FIG. 3, taken along line 7-7 of FIG. 3. FIG. 9 is a block diagram illustrating components of an aircraft 10, according to the present disclosure. Although not required, propulsors 100 illustrated in FIGS. 3-6 may be, or may be referred to herein as, cross-sectional views of a portion of aircraft 10 of FIG. 1 taken along line 3-3 of FIG. 1. Similarly, the block diagram of FIG. 9 may illustrate components that may be included in and/or utilized with aircraft 10 of FIG. 1.

Turning now to the collective illustrations of FIGS. 2-6, propulsors 100 include a housing 110 that defines a partially enclosed volume 112. Partially enclosed volume 112 extends from an inlet 114 to both a first thrust outlet 116 and a second thrust outlet 118. Inlet 114 also may be referred to herein as a fluid inlet 114 and/or as an air inlet 114. First thrust outlet 116 also may be referred to herein as a horizontal thrust outlet 116, and second thrust outlet 118 also may be referred to herein as a vertical thrust outlet 118.

Propulsors 100 also include a fan assembly 120. Fan assembly 120 includes a plurality of blades 122 that extends radially from an axis of rotation 124. Fan assembly 120 is positioned at least partially, or even completely, within partially enclosed volume 112 and is configured to provide a motive force for a fluid flow 40 into partially enclosed volume 112 via inlet 114. Fluid flow 40 that enters inlet 114 also may be referred to herein as an inlet fluid flow 41. As used herein, the term fluid, when used as a noun, refers to a free-flowing, deformable substance with no fixed shape, including, inter alia, a gas (e.g., air, atmosphere, etc.), a liquid (e.g., water), and plasma.

Propulsors 100 further include a blade pitch control mechanism 140. Blade pitch control mechanism 140 is configured to selectively vary a pitch angle of each blade in the plurality of blades. Propulsors 100 also include an, or at least one, outlet flow control assembly 150. Outlet flow control assembly 150 is configured to direct fluid flow 40 to preferentially exit partially enclosed volume 112 via a selected one of first thrust outlet 116 and second thrust outlet 118. Fluid flow 40 that exits first thrust outlet 116 also may be referred to herein as a first thrust outlet fluid flow 42. Fluid flow 40 that exits second thrust outlet 118 also may be referred to herein as a second thrust outlet fluid flow 43.

During operation of propulsors 100 and/or of aircraft 10 that include propulsors 100, fluid flow 40 that exits partially enclosed volume 112 via first thrust outlet 116 (i.e., first thrust outlet fluid flow 42) may provide horizontal thrust. In the example of FIG. 1, such fluid flow may provide a motive force for motion of aircraft 10 in the horizontal direction, or along the x-axis of FIG. 1, and may be utilized for horizontal flight of the aircraft. In contrast, fluid flow 40 that exits partially enclosed volume 112 via second thrust outlet 118 (i.e., second thrust outlet fluid flow 43) may provide vertical thrust. In the example of FIG. 1, such fluid flow may provide a motive force for motion of aircraft 10 in the vertical direction, or along the z-axis of FIG. 1, and may be utilized for vertical take-off and landing of the aircraft.

As such, an aircraft 10 that is equipped with, or that includes, propulsors 100, according to the present disclosure, may be configured for horizontal flight, vertical take-off and landing, and transition flight. In addition, such an aircraft may be configured to permit both horizontal flight and vertical take-off and landing without utilizing, or without the need for, separate horizontal and vertical thrusters that often are present in the prior art and/or without the need for, or without utilizing, the tilt mechanisms that often are present in the prior art. Thus, aircraft 10, according to the present disclosure, or at least propulsors 100 thereof, may be significantly more economical to build, may be less complex, and/or may be lighter when compared to VTOL airplanes in the prior art.

In aircraft 10 and/or propulsors 100, according to the present disclosure, blade pitch control mechanism 140 and outlet flow control assembly 150 together may be utilized to preferentially direct fluid flow 40 to exit partially enclosed volume 112 via the selected one of first thrust outlet 116 and second thrust outlet 118. As an example, and when the fluid flow exits partially enclosed volume 112 via first thrust outlet 116, aircraft 10 may be in, or may be referred to herein as being in, a horizontal flight configuration. In such a configuration, blade pitch control mechanism 140 may selectively adjust the pitch angle of blades 122 to a radial flow pitch angle range, examples of which are disclosed herein. When the pitch angle is in the radial flow pitch angle range, fan assembly 120 may preferentially accelerate fluid flow 40 in a radial direction 134, toward first thrust outlet 116, and/or away from axis of rotation 124. In addition, outlet flow control assembly 150, or at least an outlet flow control assembly 150 that is associated with first thrust outlet 116, may have an open orientation 154 and/or may be configured to direct fluid flow 40 to preferentially exit partially enclosed volume 112 via first thrust outlet 116, as illustrated in FIG. 5. Such a configuration also may be referred to herein as a radial flow configuration for propulsor 100.

In contrast, when the fluid flow exits partially enclosed volume 112 via second thrust outlet 118, aircraft 10 may be in, or may be referred to herein as being in, a vertical flight, or a VTOL, configuration. In such a configuration, blade pitch control mechanism 140 may selectively adjust the pitch angle of blades 122 to an axial flow pitch angle range, examples of which are disclosed herein. When the pitch angle is in the axial flow pitch angle range, fan assembly 120 may preferentially accelerate fluid flow 40 in an axial direction 136, toward second thrust outlet 118, and/or along axis of rotation 124. In addition, outlet flow control assembly 150, or at least the outlet flow control assembly that is associated with first thrust outlet 116, may have a closed orientation 156 and/or may be configured to resist fluid flow from partially enclosed volume 112 via first thrust outlet 116, as illustrated in FIG. 6. Such a configuration also may be referred to herein as an axial flow configuration for propulsor 100.

Housing 110 may include any suitable structure that may include, form, and/or define inlet 114, first thrust outlet 116, second thrust outlet 118, and/or partially enclosed volume 112. Examples of housing 110 include a duct and/or a nacelle. It is within the scope of the present disclosure that housing 110 and/or partially enclosed volume 112 thereof may have and/or define any suitable shape. Similarly, inlet 114, first thrust outlet 116, and second thrust outlet 118 may have any suitable orientation, or relative orientation. In addition, housing 110 and/or inlet 114, first thrust outlet 116, second thrust outlet 118, and/or partially enclosed volume 112 thereof may have any suitable location within aircraft 10, examples of which are disclosed herein.

As an example, inlet 114 may face in an inlet direction 115, first thrust outlet 116 may face in a first thrust outlet direction 117, and inlet direction 115 may be perpendicular, or at least substantially perpendicular, to first thrust outlet direction 117. Stated another way, fluid flow 40 may enter inlet 114 from inlet direction 115 and may exit first thrust outlet 116 in outlet direction 117. As such, a flow direction, or a bulk flow direction, of fluid flow 40 upon exiting first thrust outlet 116 may be perpendicular, or at least substantially perpendicular, to a flow direction, or a bulk flow direction, of fluid flow 40 upon entering inlet 114. Stated yet another way, first thrust outlet 116 may be positioned to direct fluid flow 40 to exit partially enclosed volume 112 at first thrust outlet direction 117, which may be perpendicular, or at least substantially perpendicular, to inlet direction 115 from which fluid flow 40 enters inlet 114. Fluid flow 40 may be directed, by blade pitch control mechanism 140 and blades 122, which manipulate the fluid flow, to first thrust outlet 116, thereby producing horizontal propulsion, or a radial thrust, relative to axis of rotation 124.

As another example, second thrust outlet 118 may be opposed to, or may face away from inlet 114. Stated another way, second thrust outlet 118 may face in a second thrust outlet direction 119, and inlet direction 115 may be parallel to second thrust outlet direction 119 and/or may be opposed to, or opposite, second thrust outlet direction 119. As such, a flow direction, or a bulk flow direction, of fluid flow 40 upon exiting second thrust outlet 118 may be parallel, or at least substantially parallel, to the flow direction, or the bulk flow direction, of fluid flow 40 upon entering inlet 114. Additionally or alternatively, the flow direction, or the bulk flow direction, of fluid flow 40 upon exiting second thrust outlet 118 may be perpendicular, or at least substantially perpendicular, to the flow direction, or the bulk flow direction, of fluid flow 40 upon exiting first thrust outlet 116. Stated yet another way, second thrust outlet 118 may be positioned to direct fluid flow 40 to exit partially enclosed volume 112 at second thrust outlet direction 119, which may be parallel, or at least substantially parallel, to inlet direction 115. Fluid flow 40 may be directed, by blade pitch control mechanism 140 and blades 122, which manipulate the fluid flow, to second thrust outlet direction 119, thereby producing vertical propulsion, or an axial thrust, relative to the axis of rotation 124.

As yet another example, inlet 114 may define an inlet plane 165, first thrust outlet 116 may define a first thrust outlet plane 167, and second thrust outlet 118 may define a second thrust outlet plane 169, as illustrated in FIG. 3. Under these conditions, inlet plane 165 may be, or may be referred to herein as being, perpendicular, or at least substantially perpendicular, to first thrust outlet plane 167. Additionally or alternatively, inlet plane 165 may be, or may be referred to herein as being, within a threshold first thrust outlet deviation angle of being perpendicular to first thrust outlet plane 167. Similarly, inlet plane 165 may be, or may be referred to herein as being, parallel, or at least substantially parallel, to second thrust outlet plane 169. Additionally or alternatively, inlet plane 165 may be, or may be referred to herein as being, within a threshold second thrust outlet deviation angle of being parallel to second thrust outlet plane 169. Examples of the threshold first thrust outlet deviation angle and/or of the second thrust outlet deviation angle include angles of less than 10 degrees, less than 8 degrees, less than 6 degrees, less than 4 degrees, less than 2 degrees, or less than 1 degree.

Fan assembly 120 may include any suitable structure that may be adapted, configured, shaped, designed, and/or constructed to include blades 122, to provide the motive force for fluid flow 40 into partially enclosed volume 112 via inlet 114, and/or to permit adjustment of the pitch angle by blade pitch control mechanism 140. As an example, fan assembly 120 may include a central hub 126, and blades 122 may be operatively attached to, may extend from, and/or may extend radially from, central hub 126. As another example, each blade 122 may be operatively attached to central hub 126 via a respective pivot point 128. Under these conditions, blade pitch control mechanism 140 may be configured to selectively vary the pitch angle via rotation of each blade about a respective pivot axis 130 that is defined by pivot point 128. As illustrated in FIGS. 2-6, pivot axis 130 may be perpendicular, or at least substantially perpendicular, to axis of rotation 124. Additionally or alternatively, pivot axis 130 may be within a threshold pivot axis angle of being perpendicular to axis of rotation 124. Examples of the threshold pivot axis angle include angles of less than 10 degrees, less than 8 degrees, less than 6 degrees, less than 4 degrees, less than 2 degrees, or less than 1 degree.

Examples of blades 122, of rotation of blades 122 about pivot axis 130 and/or of a pitch angle 132 of blades 122 are illustrated in FIGS. 7-8. As illustrated in FIG. 7, pitch angle 132 may be defined between blades 122, or between a region of blades 122 that is proximal and/or adjacent central hub 126, and an axis 131 that extends through pivot point 128 and is perpendicular, or at least substantially perpendicular, to both pivot axis 130 and axis of rotation 124. FIG. 7 illustrates rotation of blade 122, about pivot axis 130 and/or via pivot point 128, through a variety of pitch angles, including a pitch angle of zero degrees, as illustrated in dash-dot lines, and a pitch angle of 90 degrees, as illustrated in solid lines. Additional examples of pitch angle 132 are disclosed herein.

FIGS. 7-8 also illustrate various shapes, or cross-sectional shapes, for blades 122. Examples of suitable blade shapes include flat, or at least substantially flat, cross-sectional shapes, as illustrated in FIG. 7, curved and/or arcuate cross-sectional shapes, as illustrated in FIG. 8, and/or twisted shapes, such as when blades 122 twist along an elongate axis thereof.

Blade pitch control mechanism 140 may include any suitable structure that may be adapted, configured, designed, and/or constructed to selectively vary the pitch angle of each blade 122 of fan assembly 120. This may include selective variation of the pitch angle relative to, or with reference to, any suitable point of reference. Examples of blade pitch control mechanism 140 include a lever, a servo, and/or a servo motor configured to selectively vary the respective pitch angle of each blade in the plurality of blades. Additional examples of blade pitch control mechanism 140 are known to those of ordinary skill in the art.

As an example, each blade 122 may have and/or define a corresponding elongate axis, and blade pitch control mechanism 140 may be configured to selectively vary the pitch angle of each blade in the plurality of blades via rotation of each blade about the corresponding elongate axis. Under these conditions, the elongate axis may be parallel to, or coextensive with, pivot axis 130 of FIGS. 2-6, and pivot axis 130 also may be referred to herein as an elongate axis 130 of blades 122. As another example, and as illustrated in FIG. 7, a pitch angle 132 of blades 122 may be defined and/or referenced relative to a line 138 that is perpendicular to axis of rotation 124. As yet another example, the pitch angle may be defined between axis of rotation 124, or line 138, and an axis of rotation-proximal end of each blade in the plurality of blades.

It is within the scope of the present disclosure that blade pitch control mechanism 140 may be configured to selectively vary the pitch angle 132 between a minimum pitch angle and a maximum pitch angle. Both the radial flow pitch angle range and the axial flow pitch angle range may be within, may be encompassed by, and/or may be between the minimum pitch angle and the maximum pitch angle.

Examples of the minimum pitch angle include minimum pitch angles of at least 0 degrees, at least 2.5 degrees, at least 5 degrees, at least 7.5 degrees, at least 10 degrees, at least 12.5 degrees, at least 15 degrees, at least 20 degrees, at least 25 degrees, and/or at least 30 degrees. Additional or alternative examples of the minimum pitch angle include pitch angles of at most 45 degrees, at most 40 degrees, at most 35 degrees, at most 30 degrees, at most 25 degrees, at most 20 degrees, at most 15 degrees, at most 12.5 degrees, at most 10 degrees, at most 7.5 degrees, and/or at most 5 degrees.

Examples of the maximum pitch angle include maximum pitch angles of at least 45 degrees, at least 50 degrees, at least 55 degrees, at least 60 degrees, at least 65 degrees, at least 70 degrees, at least 75 degrees, and/or at least 80 degrees. Additional or alternative examples of the maximum pitch angle include maximum pitch angles of at most 90 degrees, at most 87.5 degrees, at most 80 degrees, at most 77.5 degrees, at most 75 degrees, at most 70 degrees, at most 65 degrees, and/or at most 60 degrees.

Examples of the radial flow pitch angle range include pitch angles of at least 45 degrees, at least 50 degrees, at least 55 degrees, at least 60 degrees, at least 65 degrees, at least 70 degrees, at least 75 degrees, and/or at least 80 degrees. Additional or alternative examples of the radial flow pitch angle range include pitch angles of at most 90 degrees, at most 87.5 degrees, at most 80 degrees, at most 77.5 degrees, at most 75 degrees, at most 70 degrees, at most 65 degrees, and/or at most 60 degrees.

Examples of the axial pitch angle range include pitch angles of at least 0 degrees, at least 2.5 degrees, at least 5 degrees, at least 7.5 degrees, at least 10 degrees, at least 12.5 degrees, at least 15 degrees, at least 20 degrees, at least 25 degrees, and/or at least 30 degrees. Additional or alternative examples of the axial pitch angle range include pitch angles of at most 45 degrees, at most 40 degrees, at most 35 degrees, at most 30 degrees, at most 25 degrees, at most 20 degrees, at most 15 degrees, at most 12.5 degrees, at most 10 degrees, at most 7.5 degrees, and/or at most 5 degrees.

Outlet flow control assembly 150 may include any suitable structure that may be adapted, configured, designed, and/or constructed to direct fluid flow 40 to preferentially exit partially enclosed volume 112 via the selected one of first thrust outlet 116 and second thrust outlet 118. Examples of outlet flow control assembly 150 include at least one louver, a plurality of louvers, at least one shutter, a plurality of shutters, at least one closure, and/or a plurality of closures. Outlet flow control assembly 150 may be configured to rotate, to physically rotate, to translate, and/or to physically translate any suitable structure, such as the at least one louver, the at least one shutter, and/or the at least one enclosure, to transition between open orientation 154 and closed orientation 156. With this in mind, outlet flow control assembly 150 further may include one or more actuators, hydraulic actuators, electrical actuators, motors, and/or stepper motors that may be configured to accomplish and/or facilitate this rotation and/or translation.

Outlet flow control assembly 150 may direct fluid flow 40 in any suitable manner. As an example, outlet flow control assembly 150 may be configured to selectively transition among a plurality of orientations, as illustrated in dash-dot lines in FIGS. 5-6, between open orientation 154, which is illustrated in solid lines in FIG. 5, and closed orientation 156, which is illustrated in solid lines in FIG. 6. When in open orientation 154, outlet flow control assembly 150 may permit, or may be configured to permit, flow of fluid flow 40 from partially enclosed volume 112 via first thrust outlet 116. In contrast, when in closed orientation 156, outlet flow control assembly 150 may occlude, restrict, and/or block fluid flow 40 from partially enclosed volume 112 via first thrust outlet 116. When fluid flow 40 through first thrust outlet 116 is occluded, as illustrated by closed orientation 156 of FIG. 6, fluid flow 40 may preferentially exit partially enclosed volume 112 via second thrust outlet 118, as also illustrated in FIG. 6.

It is within the scope of the present disclosure that propulsors 100, according to the present disclosure, may be configured to selectively, or cooperatively, regulate both blade pitch control mechanism 140 and outlet flow control assembly 150. This selective regulation may be such that, when the pitch angle of each blade 122 in the plurality of blades is within the radial flow pitch angle range, outlet flow control assembly 150 is configured to permit fluid flow 40 from partially enclosed volume 112 via first thrust outlet 116

(e.g., is in open orientation 154 that is illustrated in solid lines in FIG. 5). Additionally or alternatively, this selective regulation also may be such that, when the pitch angle of each blade is within the axial flow pitch angle range, outlet flow control assembly 150 is configured to restrict fluid flow 40 from partially enclosed volume 112 via first thrust outlet 116 (e.g., is in closed orientation 156 that is illustrated in solid lines in FIG. 6).

Propulsors 100, according to the present disclosure, include at least one outlet flow control assembly 150 that is associated with and/or configured to selectively regulate fluid flow 40 from partially enclosed volume 112 via and/or through first thrust outlet 116. This outlet flow control assembly 150 is illustrated in solid lines in FIGS. 2-6. It is within the scope of the present disclosure that this outlet flow control assembly 150 may be a first outlet flow control assembly 151 and that propulsors 100 also may include a second outlet flow control assembly 152, which is illustrated in dashed lines in FIGS. 2-6. Second outlet flow control assembly 152, when present, may be associated with and/or may be configured to selectively regulate fluid flow 40 from partially enclosed volume 112 via and/or through second thrust outlet 118.

Second outlet flow control assembly 152 may be formed and/or defined by any suitable structure. As examples, second outlet flow control assembly 152 may include at least one second louver, a plurality of second louvers, at least one second shutter, a plurality of second shutters, at least one second closure, and/or a plurality of second closures.

Similar to first outlet flow control assembly 151, second outlet flow control assembly 152 may be configured to selectively transition among a plurality of orientations, as illustrated in dash-dot lines in FIGS. 5-6, between a second open orientation, as indicated in dashed lines in FIG. 6 at 154, and a second closed orientation, as indicated in dashed lines in FIG. 5 at 156. Second open orientation 154 may permit fluid flow 40 from partially enclosed volume 112 via second thrust outlet 118, while second closed orientation 156 may occlude, restrict, and/or block fluid flow 40 from partially enclosed volume 112 via second thrust outlet 118.

When propulsors 100 include second outlet flow control assembly 152, propulsors 100 may be configured to selectively and/or cooperatively regulate the operation of both blade pitch control mechanism 140 and second outlet flow control assembly 152. This selective regulation may be such that, when the pitch angle of each blade 122 in the plurality of blades is within the radial flow pitch angle range, second outlet flow control assembly 152 is configured to restrict fluid flow 40 from partially enclosed volume 112 via the second thrust outlet 118. Additionally or alternatively, this selective regulation also may be such that, when the pitch angle of each blade 122 in the plurality of blades is within the axial flow pitch angle range, second outlet flow control assembly 152 is configured to permit fluid flow 40 from partially enclosed volume 112 via second thrust outlet 118.

As illustrated in dash-dot lines in FIGS. 5-6 and discussed herein, outlet flow control assemblies 150, according to the present disclosure, may be configured to selectively transition among a plurality of orientations between open orientation 154 and closed orientation 156. With this in mind, it is within the scope of the present disclosure that propulsors 100 may be operated in one or more configurations in which propulsors 100 generate both horizontal thrust and vertical thrust. In such configurations, outlet flow control assemblies 150, including first outlet flow control assembly 151 and/or second outlet flow control assembly 152, may be configured to an intermediate orientation that is between open orientation 154 and closed orientation 156, thereby permitting fluid flow 40 from partially enclosed volume 112 via both first thrust outlet 116 and second thrust outlet 118.

As illustrated in dashed lines in FIGS. 3 and 5-6, propulsors 100 may include one or more flow-directing structures 170. Flow-directing structures 170, when present, may be positioned within partially enclosed volume 112 and may be configured to direct, or to selectively direct, fluid flow 40 within partially enclosed volume 112. As an example, flow-directing structures 170 may be configured to direct fluid flow 40 from inlet 114 to first thrust outlet 116, as illustrated in FIG. 5. As another example, flow-directing structures 170 may be configured to direct fluid flow 40 from inlet 114 to second thrust outlet 118, as illustrated in FIG. 6. As yet another example, flow-directing structures 170 may be configured to selectively direct fluid flow 40 from inlet 114 to the selected one of first thrust outlet 116 and second thrust outlet 118. An example of flow-directing structures 170 includes one or more stator vanes.

Turning now to FIGS. 3 and 9, propulsors 100 and/or aircraft 10 including propulsors 100 may include one or more additional structures that may be adapted, configured, designed, and/or constructed to power propulsors 100 and/or to control the operation of propulsors 100. As an example, propulsors 100 and/or aircraft 10 may include a power source 180. Power source 180 may be configured to provide a motive force for rotation of fan assembly 120 about axis of rotation 124. Examples of power source 180 include a motor, an electric motor, a combustion motor, and/or a jet engine.

As another example, propulsors 100 and/or aircraft 10 may include a power supply 182 configured to energize power source 180. Examples of power supply 182 include an energy storage device, an electrical energy storage device, a battery, and/or a volume of fuel.

In one example, and as illustrated in FIG. 9, an aircraft 10 may include a plurality of propulsors 100 and each propulsor 100 may have associated therewith a corresponding blade pitch control mechanism 140 and a corresponding power source 180, in the form of an electric motor, that is configured to provide the motive force for rotation of fan assembly 120 about axis of rotation 124. Aircraft 10 also may include a power supply 182, in the form of an electrical energy source, that is configured to provide an electric current to the electric motor via a corresponding motor controller 184. Motor controller 184 also may be referred to herein as a speed controller and/or as an electronic speed controller and may be configured to control, to regulate, and/or to specify a rotation frequency of fan assembly 120 about axis of rotation 124.

Aircraft 10 further may include a flight control unit 190. Flight control unit 190 may be programmed to control the operation of motor controller 184, of blade pitch control mechanism 140, and/or of outlet flow control assembly 150. This may include control to select between generation of horizontal and/or vertical thrust by propulsors 100 and/or control to balance moments generated by propulsors 100, thereby maintaining stable flight for aircraft 10. Additionally or alternatively, flight control unit 190 may be programmed to control the operation of propulsors 100 and/or of aircraft 10 by performing any suitable step of any of methods 300 that are discussed in more detail herein.

Figure 10:
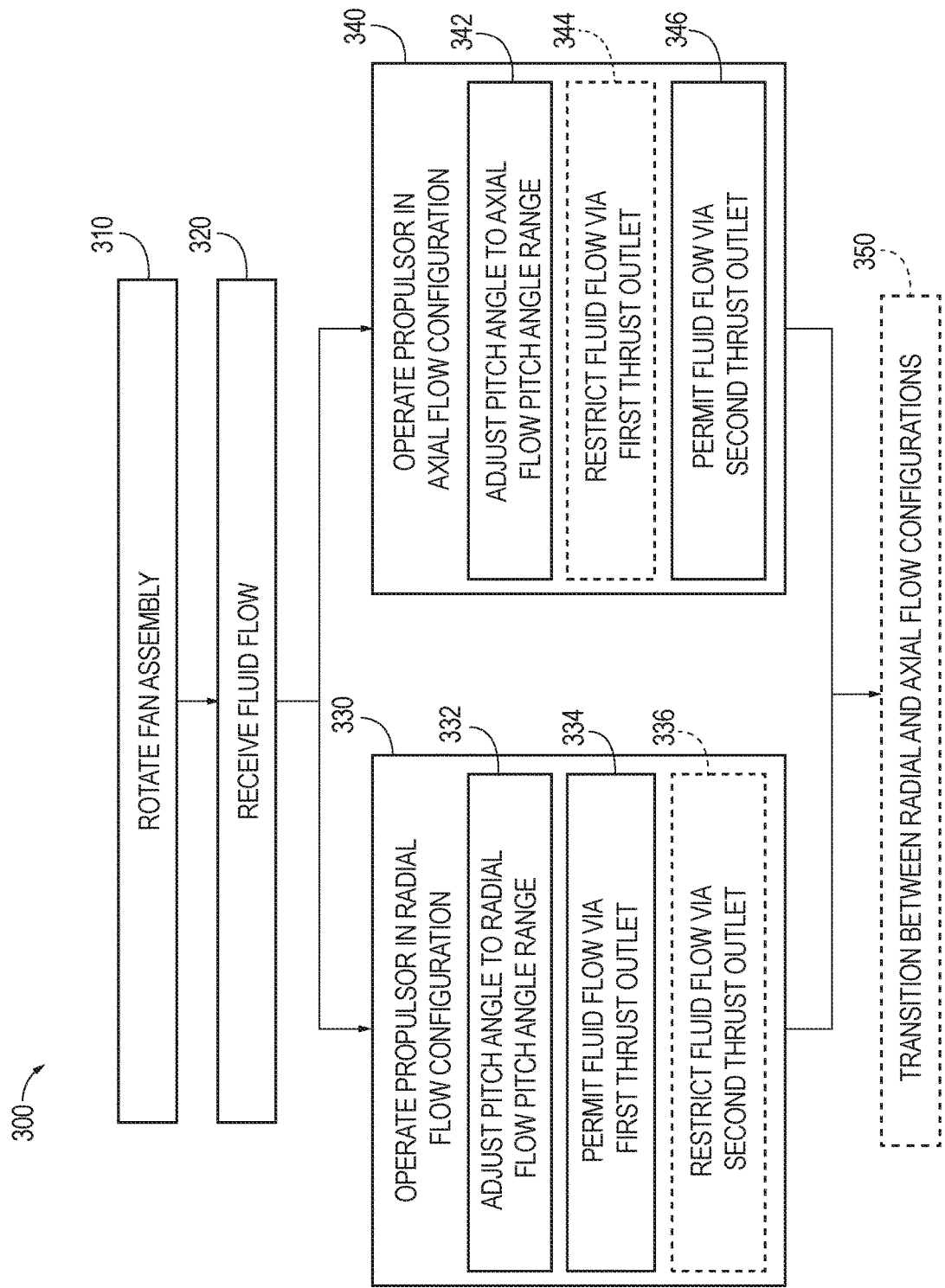
FIG. 10 is a flowchart depicting methods, according to the present disclosure, of directing fluid flow in a propulsor.

FIG. 10 is a flowchart depicting methods 300, according to the present disclosure, of directing fluid flow in a propulsor, such as propulsor 100 of FIGS. 1-9. Methods 300 include rotating a fan assembly at 310 and receiving a fluid flow at 320. Methods 300 also include operating a propulsor in a radial flow configuration at 330 and operating the propulsor in an axial flow configuration at 340. Methods 300 further may include transitioning between the radial flow configuration and the axial flow configuration at 350.

Rotating the fan assembly at 310 may include rotating the fan assembly, which forms a portion of the propulsor, about an axis of rotation. This may include rotating the fan assembly to produce, to generate, and/or to provide a motive force for fluid flow into a partially enclosed volume of the propulsor via an inlet of the propulsor.

The fan assembly may include a plurality of blades extending radially from the axis of rotation, and the rotating at 310 may include rotating the plurality of blades about the axis of rotation. Examples of the fan assembly are illustrated in FIGS. 2-9 and indicated at 120. Examples of the axis of rotation are illustrated in FIGS. 2-8 and indicated at 124. Examples of the blades are illustrated in FIGS. 2-8 and indicated at 122.

It is within the scope of the present disclosure that the rotating at 310 may include rotating the fan assembly with any suitable rotational frequency and/or within any suitable rotational frequency range. Examples of the rotational frequency include rotational frequencies of at least 1000 revolutions per minute (RPM), at least 1250 RPM, at least 1500 RPM, at least 1750 RPM, at least 2000 RPM, at least 2250 RPM, and/or at least 2500 RPM. Additional or alternative examples of the rotational frequency include rotational frequencies of at most 4000 RPM, at most 3750 RPM, at most 3500 RPM, at most 3250 RPM, at most 3000 RPM, at most 2750 RPM, at most 2500 RPM, at most 2250 RPM, and/or at most 2000 RPM.

Receiving the fluid flow at 320 may include receiving, or flowing, the fluid flow into the partially enclosed volume of the propulsor via the inlet of the propulsor and may be responsive to, or a result of, the rotating at 310. The partially enclosed volume may extend from the inlet to both a first thrust outlet and a second thrust outlet, and the fan assembly may be positioned at least partially within the partially enclosed volume. Examples of the partially enclosed volume are disclosed herein with reference to partially enclosed volume 112 of FIGS. 2-6. Examples of the inlet are disclosed herein with reference to inlet 114 of FIGS. 2-6. Examples of the first thrust outlet are disclosed herein with reference to first thrust outlet 116 of FIGS. 2-6. Examples of the second thrust outlet are disclosed herein with reference to second thrust outlet 118 of FIGS. 2-6.

Operating the propulsor in the radial flow configuration at 330 includes adjusting, at 332, a pitch angle of each blade in the plurality of blades to a radial flow pitch angle range. Operating the propulsor in the radial flow configuration at 330 also includes permitting, at 334, fluid flow from the partially enclosed volume via the first thrust outlet. Operating the propulsor in the radial flow configuration at 330 further may include restricting, at 336, fluid flow from the partially enclosed volume via the second thrust outlet.

The adjusting at 332 may include adjusting the pitch angle to any suitable radial flow pitch angle range, examples of which are disclosed herein. This may include adjusting with, via, and/or utilizing a blade pitch control mechanism, such as blade pitch control mechanism 140 of FIGS. 2-6 and 7, such as via rotating each blade about a corresponding pivot axis 130, as illustrated in FIGS. 2-8.

The permitting at 334 may include permitting the fluid flow from the partially enclosed volume via the first thrust outlet in any suitable manner. As an example, the permitting at 334 may include permitting with, via, and/or utilizing an outlet flow control assembly, or a first outlet flow control assembly, that is associated with the first thrust outlet of the propulsor. This may include passively permitting the fluid flow, such as when the outlet flow control assembly already is configured to permit the fluid flow from the partially enclosed volume via the first thrust outlet. Additionally or alternatively, this may include actively permitting the fluid flow, such as by transitioning the outlet flow control assembly to an open orientation and/or from a closed orientation to the open orientation. Examples of the outlet flow control assembly are illustrated in FIGS. 2-6 at 150. Examples of the first outlet flow control assembly are illustrated in FIGS. 2-6 at 151. An example of the open orientation is illustrated in FIG. 5 at 154. An example of the closed orientation is illustrated in FIG. 6 at 156.

The restricting at 336 may include restricting the fluid flow from the partially enclosed volume via the second thrust outlet in any suitable manner. As an example, the restricting at 336 may include restricting with, via, and/or utilizing a second outlet flow control assembly that is associated with the second thrust outlet of the propulsor. This may include passively restricting the fluid flow, such as when the second outlet flow control assembly already is configured to restrict the fluid flow from the partially enclosed volume via the second thrust outlet. Additionally or alternatively, this may include actively restricting the fluid flow, such as by transitioning the second outlet flow control assembly to a second closed orientation and/or from a second open orientation to the second closed orientation. Examples of the second outlet flow control assembly are illustrated in FIGS. 2-6 at 152.

Operating the propulsor in the axial flow configuration at 340 includes adjusting, at 342, the pitch angle of each blade in the plurality of blades to an axial flow pitch angle range that differs from the radial flow pitch angle range. Operating the propulsor in the axial flow configuration at 340 also includes restricting, at 344, fluid flow from the partially enclosed volume via the first thrust outlet. Operating the propulsor in the axial flow configuration at 340 further includes permitting, at 346, fluid flow from the partially enclosed volume via the second thrust outlet.

The adjusting at 342 may include adjusting the pitch angle to any suitable axial flow pitch angle range, examples of which are disclosed herein. The adjusting at 342 may be performed in a manner that is similar, or at least substantially similar, to the adjusting at 332 with the exception that the axial flow pitch angle range differs from the radial flow pitch angle range. Thus, the adjusting at 342 may include adjusting with, via, and/or utilizing the blade pitch control mechanism, such as blade pitch control mechanism 140 of FIGS. 2-6 and 9, such as via rotating each blade about a corresponding pivot axis 130, as illustrated in FIGS. 2-8.

The restricting at 344 may include restricting the fluid flow from the partially enclosed volume via the first thrust outlet in any suitable manner. As an example, the restricting at 344, when performed, may include restricting with, via, and/or utilizing the outlet flow control assembly, or the first outlet flow control assembly, that is associated with the first thrust outlet of the propulsor and is discussed herein with reference to the permitting at 334. This may include passively restricting the fluid flow, such as when the outlet flow control assembly already is configured to restrict the fluid flow from the partially enclosed volume via the first thrust outlet. Additionally or alternatively, this may include actively restricting the fluid flow, such as by transitioning the outlet flow control assembly to the closed orientation and/or from the open orientation to the closed orientation.

The permitting at 346 may include permitting the fluid flow from the partially enclosed volume via the second thrust outlet in any suitable manner. As an example, the permitting at 346 may include permitting with, via, and/or utilizing the second outlet flow control assembly that is associated with the second thrust outlet of the propulsor and is discussed herein with reference to the restricting at 336. This may include passively permitting the fluid flow, such as when the second outlet flow control assembly already is configured to permit the fluid flow from the partially enclosed volume via the second thrust outlet. Additionally or alternatively, this may include actively permitting the fluid flow, such as by transitioning the second outlet flow control assembly to the second open orientation and/or from the second closed orientation to the second open orientation.

It is within the scope of the present disclosure that the operating at 330 and the operating at 340 may be performed with any suitable timing and/or sequence during methods 300. As an example, methods 300 may include performing the operating at 330 and the operating at 340 sequentially. As another example, methods 300 may include performing the operating at 330 subsequent to the operating at 340. As yet another example, methods 300 may include performing the operating at 330 prior to the operating at 340.

Transitioning between the radial flow configuration and the axial flow configuration at 350 may include transitioning, or repeatedly transitioning, between the operating at 330 and the operating at 340. The transitioning at 350 may permit and/or enable selective horizontal flight (during the operating at 330) and vertical take-off and landing (during the operating at 340) of an aircraft that includes a propulsor that performs the methods.

Illustrative, non-exclusive examples of inventive subject matter according to the present disclosure are described in the following enumerated paragraphs:

A1. A propulsor, optionally a propulsor for an aircraft, comprising:

a housing defining a partially enclosed volume that extends from an inlet to both a first thrust outlet and a second thrust outlet;

a fan assembly including a plurality of blades extending radially from an axis of rotation, wherein the fan assembly is positioned at least partially within the partially enclosed volume and is configured to provide a motive force for fluid flow into the partially enclosed volume via the inlet;

a blade pitch control mechanism configured to selectively vary a respective pitch angle of each blade in the plurality of blades; and an outlet flow control assembly configured to direct the fluid flow to preferentially exit the partially enclosed volume via a selected one of the first thrust outlet and the second thrust outlet.

A2. The propulsor of paragraph A1, wherein the first thrust outlet faces in a first thrust outlet direction, wherein the inlet faces in an inlet direction, and further wherein the first thrust outlet direction is at least substantially perpendicular to the inlet direction.

A2.1 The propulsor of any of paragraphs A1-A2, wherein the first thrust outlet is positioned to direct the fluid flow to exit the partially enclosed volume at a first thrust outlet direction, and further wherein the first thrust outlet direction is at least substantially perpendicular to an inlet direction from which the fluid flow enters the inlet.

A2.1.1 The propulsor of paragraph A2.1, wherein the fluid flow is further directed by the blade pitch control mechanism and the plurality of blades positioned at the respective pitch angle that manipulates the fluid flow to the first thrust outlet direction to produce a horizontal propulsion, or a radial thrust, relative to the axis of rotation.

A3. The propulsor of any of paragraphs A1-A2.1.1, wherein the fluid flow enters the inlet from an/the inlet direction, wherein the fluid flow exits the first thrust outlet in a/the first thrust outlet direction, and further wherein the inlet direction is at least substantially perpendicular to the first thrust outlet direction.

A4. The propulsor of any of paragraphs A1-A3, wherein the second thrust outlet is opposed to the inlet.

A5. The propulsor of any of paragraphs A1-A4, wherein the second thrust outlet faces in a second thrust outlet direction, wherein the inlet faces in an inlet direction, and further wherein the second thrust outlet direction at least one of is at least substantially parallel to the inlet direction and is at least substantially opposite the inlet direction.

A5.1 The propulsor of any of paragraphs A1-A5, wherein the second thrust outlet is positioned to direct the fluid flow to exit the partially enclosed volume at a second thrust outlet direction, and further wherein the second thrust outlet direction is at least substantially parallel to the inlet direction.

A5.1.1 The propulsor of paragraph A5.1, wherein the fluid flow is further directed by the blade pitch control mechanism, the plurality of blades positioned at the respective pitch angle that manipulates the fluid flow to the second thrust outlet direction to produce a vertical propulsion relative to the axis of rotation.

A6. The propulsor of any of paragraphs A1-A5.1.1, wherein an inlet plane defined by the inlet is at least one of:

(i) perpendicular to a first outlet plane defined by the first thrust outlet;

(ii) at least substantially perpendicular to the first outlet plane;

(iii) within a threshold first thrust outlet deviation angle of being perpendicular to the first outlet plane, optionally wherein the threshold first thrust outlet deviation angle is less than 10 degrees, less than 8 degrees, less than 6 degrees, less than 4 degrees, less than 2 degrees, or less than 1 degree;

(iv) parallel to a second outlet plane defined by the second thrust outlet;

(v) at least substantially parallel to the second outlet plane;

(vi) within a threshold second thrust outlet deviation angle of being parallel to the second outlet plane, optionally wherein the threshold second thrust outlet deviation angle is less than 10 degrees, less than 8 degrees, less than 6 degrees, less than 4 degrees, less than 2 degrees, or less than 1 degree.

A7. The propulsor of any of paragraphs A1-A6, wherein the fan assembly includes a central hub, and further wherein the plurality of blades is operatively attached to, and extends from, the central hub.

A8. The propulsor of paragraph A7, wherein each blade in the plurality of blades is operatively attached to the central hub via a respective pivot point, wherein the blade pitch control mechanism selectively varies the respective pitch angle of each of the plurality of blades via rotation of each of the plurality of blades about a respective pivot axis defined by the respective pivot point.

A9. The propulsor of paragraph A8, wherein the respective pivot axis is at least one of:

(i) at least substantially perpendicular to the axis of rotation;

(ii) perpendicular to the axis of rotation; and (iii) within a threshold pivot axis angle of being perpendicular to the axis of rotation, optionally wherein the threshold pivot axis angle is at least one of at least 0 degrees, at least 1 degree, at least 2 degrees, at least 4 degrees, at most 8 degrees, at most 6 degrees, at most 4 degrees, and at most 2 degrees.

A10. The propulsor of any of paragraphs A1-A9, wherein each blade in the plurality of blades is at least one of:
(i) flat;
(ii) curved;
(iii) arcuate; and
(iv) twisted.

A11. The propulsor of any of paragraphs A1-A10, wherein each blade in the plurality of blades defines a corresponding elongate axis, and further wherein the blade pitch control mechanism is configured to selectively vary the pitch angle of each blade in the plurality of blades, via rotation about the corresponding elongate axis, between a minimum pitch angle and a maximum pitch angle.

A12. The propulsor of paragraph A11, wherein the minimum pitch angle is at least one of:
(i) at least 0 degrees, at least 2.5 degrees, at least 5 degrees, at least 7.5 degrees, at least 10 degrees, at least 12.5 degrees, at least 15 degrees, at least 20 degrees, at least 25 degrees, or at least 30 degrees; and
(ii) at most 45 degrees, at most 40 degrees, at most 35 degrees, at most 30 degrees, at most 25 degrees, at most 20 degrees, at most 15 degrees, at most 12.5 degrees, at most 10 degrees, at most 7.5 degrees, or at most 5 degrees.

A13. The propulsor of any of paragraphs A11-A12, wherein the maximum pitch angle is at least one of:
(i) at least 45 degrees, at least 50 degrees, at least 55 degrees, at least 60 degrees, at least 65 degrees, at least 70 degrees, at least 75 degrees, or at least 80 degrees; and
(ii) at most 90 degrees, at most 87.5 degrees, at most 80 degrees, at most 77.5 degrees, at most 75 degrees, at most 70 degrees, at most 65 degrees, or at most 60 degrees.

A14. The propulsor of any of paragraphs A1-A13, wherein the pitch angle is defined between the axis of rotation and an axis of rotation-proximal end of each blade in the plurality of blades.

A15. The propulsor of any of paragraphs A1-A14, wherein, when the pitch angle is within a radial flow pitch angle range, the propulsor is configured to direct at least a majority of the fluid flow into the partially enclosed volume via the inlet and from the partially enclosed volume via the first thrust outlet.

A16. The propulsor of paragraph A15, wherein the radial flow pitch angle range is at least one of:
(i) at least 45 degrees, at least 50 degrees, at least 55 degrees, at least 60 degrees, at least 65 degrees, at least 70 degrees, at least 75 degrees, or at least 80 degrees; and
(ii) at most 90 degrees, at most 87.5 degrees, at most 80 degrees, at most 77.5 degrees, at most 75 degrees, at most 70 degrees, at most 65 degrees, or at most 60 degrees.

A17. The propulsor of any of paragraphs A1-A16, wherein, when the pitch angle is within an axial flow pitch angle range, the propulsor is configured to direct at least a majority of the fluid flow into the partially enclosed volume via the inlet and from the partially enclosed volume via the second thrust outlet.

A18. The propulsor of paragraph A17, wherein the axial flow pitch angle range is at least one of:
(i) at least 0 degrees, at least 2.5 degrees, at least 5 degrees, at least 7.5 degrees, at least 10 degrees, at least 12.5 degrees, at least 15 degrees, at least 20 degrees, at least 25 degrees, or at least 30 degrees; and
(ii) at most 45 degrees, at most 40 degrees, at most 35 degrees, at most 30 degrees, at most 25 degrees, at most 20 degrees, at most 15 degrees, at most 12.5 degrees, at most 10 degrees, at most 7.5 degrees, or at most 5 degrees.

A19. The propulsor of any of paragraphs A1-A18, wherein the blade pitch control mechanism includes a servo configured to selectively vary the respective pitch angle of each blade in the plurality of blades.

A20. The propulsor of any of paragraphs A1-A19, wherein the outlet flow control assembly is configured to selectively transition among a plurality of orientations between an open orientation, in which the outlet flow control assembly permits fluid flow from the partially enclosed volume via the first thrust outlet, and a closed orientation, in which the outlet flow control assembly occludes fluid flow from the partially enclosed volume via the first thrust outlet.

A21. The propulsor of any of paragraphs A1-A20, wherein the outlet flow control assembly includes at least one of:
(i) at least one louver;
(ii) a plurality of louvers;
(iii) at least one shutter;
(iv) a plurality of shutters;
(v) at least one closure; and
(vi) a plurality of closures.

A22. The propulsor of any of paragraphs A1-A21, wherein, when the propulsor is configured to selectively regulate both the blade pitch control mechanism and the outlet flow control assembly such that:
(i) when the pitch angle of each blade in the plurality of blades is within a/the radial flow pitch angle range, the outlet flow control assembly is configured to permit fluid flow from the partially enclosed volume via the first thrust outlet; and
(ii) when the pitch angle of each blade in the plurality of blades is within an/the axial flow pitch angle range, the outlet flow control assembly is configured to restrict fluid flow from the partially enclosed volume via the first thrust outlet.

A23. The propulsor of any of paragraphs A1-A22, wherein one of:
(i) the pitch angle of each blade in the plurality of blades is within a/the radial flow pitch angle range and the outlet flow control assembly permits fluid flow from the partially enclosed volume via the first thrust outlet; and
(ii) the pitch angle of each blade in the plurality of blades is within an/the axial flow pitch angle range and the outlet flow control assembly restricts fluid flow from the partially enclosed volume via the first thrust outlet.

A24. The propulsor of any of paragraphs A1-A23, wherein the outlet flow control assembly is a first outlet flow control assembly, and further wherein the propulsor includes a second outlet flow control assembly configured to selectively regulate fluid flow from the partially enclosed volume via the second thrust outlet.

A25. The propulsor of paragraph A24, wherein the second outlet flow control assembly is configured to selectively transition among a plurality of orientations between a second open orientation, in which the second outlet flow control assembly permits fluid flow from the partially enclosed volume via the second thrust outlet, and a second closed orientation, in which the outlet flow control assembly occludes fluid flow from the partially enclosed volume via the second thrust outlet.

A26. The propulsor of any of paragraphs A24-A25, wherein the second outlet flow control assembly includes at least one of:
(i) at least one second louver;
(ii) a plurality of second louvers;

(iii) at least one second shutter;
(iv) a plurality of second shutters;
(v) at least one second closure; and
(vi) a plurality of second closures.

A27. The propulsor of any of paragraphs A24-A26, wherein the propulsor is configured to selectively regulate both the blade pitch control mechanism and the outlet flow control assembly such that:
(i) when the pitch angle of each blade in the plurality of blades is within a/the radial flow pitch angle range, the second outlet flow control assembly is configured to restrict fluid flow from the partially enclosed volume via the second thrust outlet; and
(ii) when the pitch angle of each blade in the plurality of blades is within an/the axial flow pitch angle range, the second outlet flow control assembly is configured to permit fluid flow from the partially enclosed volume via the second thrust outlet.

A28. The propulsor of any of paragraphs A24-A27, wherein one of:
(i) the pitch angle of each blade in the plurality of blades is within a/the radial flow pitch angle range and the second outlet flow control assembly restricts fluid flow from the partially enclosed volume via the second thrust outlet; and
(ii) the pitch angle of each blade in the plurality of blades is within an/the axial flow pitch angle range and the second outlet flow control assembly permits fluid flow from the partially enclosed volume via the second thrust outlet.

A29. The propulsor of any of paragraphs A1-A28, wherein the propulsor further includes a power source configured to provide a motive force for rotation of the fan assembly about the axis of rotation.

A30. The propulsor of paragraph A29, wherein the power source includes at least one of:
(i) an electric motor;
(ii) a combustion motor; and
(iii) a jet engine.

A31. The propulsor of any of paragraphs A29-A30, wherein the propulsor further includes a power supply configured to energize the power source.

A32. The propulsor of paragraph A31, wherein the power supply includes at least one of:
(i) an energy storage device;
(ii) an electrical energy storage device;
(iii) a battery; and
(iv) a volume of fuel.

A33. The propulsor of any of paragraphs A1-A32, wherein the propulsor further includes at least one of:
(i) a/the electric motor configured to provide a/the motive force for rotation of the fan assembly about the axis of rotation;
(ii) an electrical energy source configured to provide an electric current to the electric motor to power the electric motor;
(iii) a motor controller configured to control a rotational frequency of the fan assembly about the axis of rotation; and
(iv) a flight control unit programmed to control the operation of the motor controller, the blade pitch control mechanism, and the outlet flow control assembly.

A34. The propulsor of paragraph A33, wherein the flight control unit further is programmed to perform any suitable step of any of the methods of any of paragraphs B1-B15.

A35. The propulsor of any of paragraphs A1-A34, wherein the propulsor further includes a flow-directing structure, wherein the flow-directing structure is positioned within the partially enclosed volume and is configured to at least one of:

(i) direct the fluid flow from the inlet to the first thrust outlet;
(ii) direct the fluid flow from the inlet to the second thrust outlet; and
(iii) selectively direct the fluid flow from the inlet to the selected one of the first thrust outlet and the second thrust outlet.

A36. An aircraft, comprising:
an airframe;
optionally at least one wing; and
at least one propulsor of any of paragraphs A1-A35, wherein the at least one propulsor is configured to selectively provide both horizontal and vertical thrust to the aircraft.

A37. The aircraft of paragraph A36, wherein the at least one propulsor is configured to facilitate vertical take-off and landing of the aircraft.

A38. The aircraft of any of paragraphs A36-A37, wherein the at least one propulsor is configured such that:
(i) when the fluid flow exits the partially enclosed volume via the first thrust outlet, the aircraft is in a horizontal flight configuration; and
(ii) when the fluid flow exits the partially enclosed volume via the second thrust outlet, the aircraft is in a vertical flight configuration.

A39. The aircraft of any of paragraphs A36-A37, wherein the at least one propulsor includes at least two outer propulsors, wherein the at least two outer propulsors are positioned on opposed sides of the aircraft and at least substantially equally spaced from a center of mass of the aircraft.

A40. The aircraft of paragraph A39, wherein the at least two outer propulsors are spaced-apart from an axis of symmetry of the aircraft.

A41. The aircraft of any of paragraphs A36-A39, wherein the at least one propulsor includes a central propulsor positioned along an/the axis of symmetry of the aircraft.

A42. The aircraft of any of paragraphs A36-A41, wherein the aircraft further includes a supplemental horizontal propulsor configured to provide supplemental thrust during horizontal flight of the aircraft.

B1. A method of selectively directing a fluid flow in between a radial flow configuration and an axial flow configuration, utilizing a propulsor, the method comprising:
rotating a fan assembly of the propulsor about an axis of rotation, wherein the fan assembly includes a plurality of blades extending radially from the axis of rotation;
responsive to the rotating, receiving the fluid flow into a partially enclosed volume of the propulsor, wherein the partially enclosed volume extends from an inlet to both a first thrust outlet and a second thrust outlet, wherein the fan assembly is positioned at least partially within the partially enclosed volume, and further wherein the receiving includes receiving via the inlet;
operating the propulsor in the radial flow configuration by:
(i) adjusting a pitch angle of each blade in the plurality of blades to a radial flow pitch angle range; and
(ii) permitting fluid flow from the partially enclosed volume via the first thrust outlet; and
operating the propulsor in the axial flow configuration by:
(i) adjusting the pitch angle of each blade in the plurality of blades to an axial flow pitch angle range, which differs from the radial flow pitch angle range;
(ii) optionally restricting fluid flow from the partially enclosed volume via the first thrust outlet; and
(iii) permitting fluid flow from the partially enclosed volume via the second thrust outlet.

B2. The method of paragraph B1, wherein at least one of:

(i) the operating the propulsor in the radial flow configuration and the operating the propulsor in the axial flow configuration are performed sequentially;

(ii) the operating the propulsor in the radial flow configuration is subsequent to the operating the propulsor in the axial flow configuration; and (iii) the operating the propulsor in the radial flow configuration is prior to the operating the propulsor in the axial flow configuration.

B3. The method of any of paragraphs B1-B2, wherein the method further includes transitioning, and optionally repeatedly transitioning, between the operating the propulsor in the radial flow configuration and the operating the propulsor in the axial flow configuration.

B4. The method of paragraph B3, wherein the transitioning includes utilizing a blade pitch control mechanism to selectively vary the pitch angle of each blade in the plurality of blades.

B5. The method of any of paragraphs B1-B4, wherein the operating the propulsor in the radial flow configuration further includes restricting fluid flow from the partially enclosed volume via the second thrust outlet.

B6. The method of paragraph B5, wherein the restricting fluid flow from the partially enclosed volume via the second thrust outlet includes transitioning a second outlet flow control assembly to a second closed orientation.

B7. The method of any of paragraphs B1-B6, wherein the radial flow pitch angle range is at least one of:

(i) at least 45 degrees, at least 50 degrees, at least 55 degrees, at least 60 degrees, at least 65 degrees, at least 70 degrees, at least 75 degrees, or at least 80 degrees; and (ii) at most 90 degrees, at most 87.5 degrees, at most 80 degrees, at most 77.5 degrees, at most 75 degrees, at most 70 degrees, at most 65 degrees, or at most 60 degrees.

B8. The method of any of paragraphs B1-B7, wherein the permitting fluid flow from the partially enclosed volume via the first thrust outlet includes transitioning an, or a first, outlet flow control assembly to a, or to a first, open orientation.

B9. The method of any of paragraphs B1-B8, wherein the axial flow pitch angle range is at least one of:

(i) at least 0 degrees, at least 2.5 degrees, at least 5 degrees, at least 7.5 degrees, at least 10 degrees, at least 12.5 degrees, at least 15 degrees, at least 20 degrees, at least 25 degrees, or at least 30 degrees; and (ii) at most 45 degrees, at most 40 degrees, at most 35 degrees, at most 30 degrees, at most 25 degrees, at most 20 degrees, at most 15 degrees, at most 12.5 degrees, at most 10 degrees, at most 7.5 degrees, or at most 5 degrees.

B10. The method of any of paragraphs B1-B9, wherein the permitting fluid flow from the partially enclosed volume via the second thrust outlet includes transitioning a/the second outlet flow control assembly to a second open orientation.

B11. The method of any of paragraphs B1-B10, wherein the restricting fluid flow from the partially enclosed volume via the first thrust outlet includes transitioning a/the first outlet flow control assembly to a first closed orientation.

B12. The method of any of paragraphs B1-B11, wherein the rotating includes rotating at a rotational frequency of at least one of:

(i) at least 1000 revolutions per minute (RPM), at least 1250 RPM, at least 1500 RPM, at least 1750 RPM, at least 2000 RPM, at least 2250 RPM, or at least 2500 RPM; and (ii) at most 4000 RPM, at most 3750 RPM, at most 3500 RPM, at most 3250 RPM, at most 3000 RPM, at most 2750 RPM, at most 2500 RPM, at most 2250 RPM, or at most 2000 RPM.

B13. The method of any of paragraphs B1-B12, wherein the rotating includes providing a motive force for fluid flow into the partially enclosed volume via the inlet.

B14. The method of any of paragraphs B1-B13, wherein the receiving includes flowing the fluid flow through the inlet and into the partially enclosed volume.

B15. The method of any of paragraphs B1-B14, wherein the propulsor includes any suitable component of, and/or optionally is the propulsor of any of paragraphs A1-A35.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A propulsor, comprising:
   a housing defining a partially enclosed volume that extends from an inlet to both a first thrust outlet and a second thrust outlet;
   a fan assembly including a plurality of blades extending radially from an axis of rotation, wherein the fan assembly is positioned at least partially within the partially enclosed volume and is configured to provide a motive force for fluid flow into the partially enclosed volume via the inlet;
   a blade pitch control mechanism configured to selectively vary a respective pitch angle of each blade in the plurality of blades wherein each blade in the plurality of blades defines a corresponding elongate axis, and further wherein the blade pitch control mechanism is configured to selectively vary the respective pitch angle of each blade in the plurality of blades, via rotation about the corresponding elongate axis, between a minimum pitch angle of at least 0 degrees and a maximum pitch angle of at most 90 degrees; and
   an outlet flow control assembly configured to direct the fluid flow to exit the partially enclosed volume via a selected one of the first thrust outlet and the second thrust outlet.

2. The propulsor of claim 1, wherein the first thrust outlet is positioned to direct the fluid flow to exit the partially enclosed volume at a first thrust outlet direction, and further wherein the first thrust outlet direction is at least perpendicular to an inlet direction from which the fluid flow enters the inlet.

3. The propulsor of claim 2, wherein the fluid flow is further directed by the blade pitch control mechanism, the plurality of blades positioned at the respective pitch angle that manipulates the fluid flow to the first thrust outlet direction to produce a horizontal propulsion relative to the axis of rotation.

4. The propulsor of claim 1, wherein the second thrust outlet is positioned to direct the fluid flow to exit the partially enclosed volume at a second thrust outlet direction, and further wherein the second thrust outlet direction is at least parallel to the inlet direction.

5. The propulsor of claim 4, wherein the fluid flow is further directed by the blade pitch control mechanism, the plurality of blades positioned at the respective pitch angle that manipulates the fluid flow to the second thrust outlet direction to produce a vertical propulsion relative to the axis of rotation.

6. The propulsor of claim 1, wherein the fan assembly includes a central hub, wherein each of the plurality of blades is operatively attached to, and extends from, the central hub via a respective pivot point, and further wherein the blade pitch control mechanism selectively varies the respective pitch angle of each of the plurality of blades via rotation of each of the plurality of blades about a respective pivot axis defined by the respective pivot point.

7. The propulsor of claim 1, wherein, when the respective pitch angle is within a radial flow pitch angle range, the propulsor is configured to direct at least a majority of the fluid flow into the partially enclosed volume via the inlet and from the partially enclosed volume via the first thrust outlet.

8. The propulsor of claim 1, wherein, when the respective pitch angle is within an axial flow pitch angle range, the propulsor is configured to direct at least a majority of the fluid flow into the partially enclosed volume via the inlet and from the partially enclosed volume via the second thrust outlet.

9. The propulsor of claim 1, wherein the outlet flow control assembly is configured to selectively transition among a plurality of orientations between an open orientation, in which the outlet flow control assembly permits fluid flow from the partially enclosed volume via the first thrust outlet, and a closed orientation, in which the outlet flow control assembly occludes fluid flow from the partially enclosed volume via the first thrust outlet.

10. The propulsor of claim 1, wherein the propulsor is configured to selectively regulate both the blade pitch control mechanism and the outlet flow control assembly such that:
   (i) when the respective pitch angle of each blade in the plurality of blades is within a radial flow pitch angle range, the outlet flow control assembly is configured to permit fluid flow from the partially enclosed volume via the first thrust outlet; and
   (ii) when the respective pitch angle of each blade in the plurality of blades is within an axial flow pitch angle range, the outlet flow control assembly is configured to restrict fluid flow from the partially enclosed volume via the first thrust outlet.

11. The propulsor of claim 1, wherein the outlet flow control assembly is a first outlet flow control assembly, and further wherein the propulsor includes a second outlet flow control assembly configured to selectively regulate fluid flow from the partially enclosed volume via the second thrust outlet.

12. The propulsor of claim 1, wherein the propulsor further includes:
   (i) an electric motor configured to provide a motive force for rotation of the fan assembly about the axis of rotation;

(ii) an electrical energy source configured to provide an electric current to the electric motor to power the electric motor;
an electronic speed controller configured to control a rotational frequency of the fan assembly about the axis of rotation; and
(iv) a flight control unit programmed to control operation of the electronic speed controller, the blade pitch control mechanism, and the outlet flow control assembly.

13. The propulsor of claim 1, wherein the propulsor further includes a flow-directing structure, wherein the flow-directing structure is positioned within the partially enclosed volume and is configured to selectively direct the fluid flow from the inlet to the selected one of the first thrust outlet and the second thrust outlet.

14. An aircraft, comprising:
an airframe; and
the propulsor of claim 1.

15. The aircraft of claim 14, wherein the propulsor is configured such that:
(i) when the fluid flow exits the partially enclosed volume via the first thrust outlet, the aircraft is in a horizontal flight configuration; and
(ii) when the fluid flow exits the partially enclosed volume via the second thrust outlet, the aircraft is in a vertical flight configuration.

16. A method of selectively directing a fluid flow in between a radial flow configuration and an axial flow configuration, utilizing a propulsor that includes a fan assembly and a blade pitch control mechanism, the method comprising:
rotating the fan assembly of the propulsor about an axis of rotation, wherein the fan assembly includes a plurality of blades extending radially from the axis of rotation, wherein each blade in the plurality of blades defines a corresponding elongate axis, and further wherein the blade pitch control mechanism is configured to selectively vary a pitch angle of each blade in the plurality of blades, via rotation about the corresponding elongate axis, between a minimum pitch angle of at least 0 degrees and a maximum pitch angle of at most 90 degrees;
responsive to the rotating, receiving the fluid flow into a partially enclosed volume of the propulsor, wherein the partially enclosed volume extends from an inlet to both a first thrust outlet and a second thrust outlet, wherein the fan assembly is positioned at least partially within the partially enclosed volume, and further wherein the receiving includes receiving via the inlet;
operating the propulsor in the radial flow configuration by:
(i) utilizing the blade pitch control mechanism, adjusting the pitch angle of each blade in the plurality of blades to a radial flow pitch angle range; and
(ii) permitting fluid flow from the partially enclosed volume via the first thrust outlet; and
operating the propulsor in the axial flow configuration by:
(i) utilizing the blade pitch control mechanism, adjusting the pitch angle of each blade in the plurality of blades to an axial flow pitch angle range, which differs from the radial flow pitch angle range; and
(ii) permitting fluid flow from the partially enclosed volume via the second thrust outlet.

17. The method of claim 16, wherein the step of operating the propulsor in the radial flow configuration and the operating the propulsor in the axial flow configuration are performed sequentially.

18. The method of claim 16, wherein the axial flow pitch angle range is at least 0 degrees and at most 45 degrees, and further wherein the radial flow pitch angle range is at least 45 degrees and at most 90 degrees.

19. The method of claim 16, wherein the step of permitting fluid flow from the partially enclosed volume via the first thrust outlet includes transitioning an outlet flow control assembly to an open orientation.

20. A propulsor, comprising:
a housing defining a partially enclosed volume that extends from an inlet to both a first thrust outlet and a second thrust outlet;
a fan assembly including a plurality of blades extending radially from an axis of rotation, wherein the fan assembly is positioned at least partially within the partially enclosed volume and is configured to provide a motive force for fluid flow into the partially enclosed volume via the inlet;
a blade pitch control mechanism configured to selectively vary a respective pitch angle of each blade in the plurality of blades; and
an outlet flow control assembly configured to direct the fluid flow to exit the partially enclosed volume via a selected one of the first thrust outlet and the second thrust outlet;
wherein the propulsor further includes a flow-directing structure, wherein the flow-directing structure is positioned within the partially enclosed volume and is configured to selectively direct the fluid flow from the inlet to the selected one of the first thrust outlet and the second thrust outlet.

21. A propulsor, comprising:
a housing defining a partially enclosed volume that extends from an inlet to both a first thrust outlet and a second thrust outlet;
a fan assembly including a plurality of blades extending radially from an axis of rotation, wherein the fan assembly is positioned at least partially within the partially enclosed volume and is configured to provide a motive force for fluid flow into the partially enclosed volume via the inlet;
a blade pitch control mechanism configured to selectively vary a respective pitch angle of each blade in the plurality of blades, wherein, when the respective pitch angle is within a radial flow pitch angle range, the propulsor is configured to direct at least a majority of the fluid flow into the partially enclosed volume via the inlet and from the partially enclosed volume via the first thrust outlet; and
an outlet flow control assembly configured to direct the fluid flow to exit the partially enclosed volume via a selected one of the first thrust outlet and the second thrust outlet.

22. A propulsor, comprising:
a housing defining a partially enclosed volume that extends from an inlet to both a first thrust outlet and a second thrust outlet;
a fan assembly including a plurality of blades extending radially from an axis of rotation, wherein the fan assembly is positioned at least partially within the partially enclosed volume and is configured to provide a motive force for fluid flow into the partially enclosed volume via the inlet;
a blade pitch control mechanism configured to selectively vary a respective pitch angle of each blade in the plurality of blades, wherein, when the respective pitch angle is within an axial flow pitch angle range, the propulsor is configured to direct at least a majority of the fluid flow into the partially enclosed volume via the inlet and from the partially enclosed volume via the second thrust outlet; and an outlet flow control assembly configured to direct the fluid flow to exit the partially enclosed volume via a selected one of the first thrust outlet and the second thrust outlet.

23. A propulsor, comprising:

a housing defining a partially enclosed volume that extends from an inlet to both a first thrust outlet and a second thrust outlet;

a fan assembly including a plurality of blades extending radially from an axis of rotation, wherein the fan assembly is positioned at least partially within the partially enclosed volume and is configured to provide a motive force for fluid flow into the partially enclosed volume via the inlet;

a blade pitch control mechanism configured to selectively vary a respective pitch angle of each blade in the plurality of blades; and an outlet flow control assembly configured to direct the fluid flow to exit the partially enclosed volume via a selected one of the first thrust outlet and the second thrust outlet;

wherein the propulsor is configured to selectively regulate both the blade pitch control mechanism and the outlet flow control assembly such that:

(i) when the respective pitch angle of each blade in the plurality of blades is within a radial flow pitch angle range, the outlet flow control assembly is configured to permit fluid flow from the partially enclosed volume via the first thrust outlet; and (ii) when the respective pitch angle of each blade in the plurality of blades is within an axial flow pitch angle range, the outlet flow control assembly is configured to restrict fluid flow from the partially enclosed volume via the first thrust outlet.

* * * * *

UNITED STATES PATENT AND TRADEMARK OFFICE
CERTIFICATE OF CORRECTION

PATENT NO. : 10,933,991 B2  
APPLICATION NO. : 16/011501  
DATED : March 2, 2021  
INVENTOR(S) : Daniel B. Cottrell Page 1 of 1

It is certified that error appears in the above-identified patent and that said Letters Patent is hereby corrected as shown below:

In the Claims

Claim 12, Column 23, Line 4, insert --(iii)-- before "an electronic speed controller"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*